US007460924B2

(12) United States Patent
Alexander et al.

(10) Patent No.: US 7,460,924 B2
(45) Date of Patent: Dec. 2, 2008

(54) IN-GUN POWER SUPPLY CONTROL

(75) Inventors: Kevin L. Alexander, Brownsburg, IN (US); Gene P. Altenberger, Maumee, OH (US); Varce E. Howe, Zionsville, IN (US); Michael C. Rodgers, Montpelier, OH (US)

(73) Assignee: Illinois Tool Works Inc., Glenview, IL (US)

( * ) Notice: Subject to any disclaimer, the term of this patent is extended or adjusted under 35 U.S.C. 154(b) by 470 days.

(21) Appl. No.: 11/153,989

(22) Filed: Jun. 16, 2005

(65) Prior Publication Data

US 2006/0283386 A1 Dec. 21, 2006

(51) Int. Cl.
*G06F 19/00* (2006.01)

(52) U.S. Cl. ......................... 700/123; 700/17; 239/690; 118/620

(58) Field of Classification Search ................. 700/123, 700/17; 239/690; 118/620, 695
See application file for complete search history.

(56) References Cited

U.S. PATENT DOCUMENTS

| | | | | |
|---|---|---|---|---|
| 3,851,618 | A | 12/1974 | Bentley | |
| 3,875,892 | A | 4/1975 | Gregg et al. | |
| 3,894,272 | A | 7/1975 | Bentley | |
| 3,940,061 | A | 2/1976 | Gimple et al. | |
| 3,964,683 | A | 6/1976 | Gimple | |
| 3,990,609 | A | 11/1976 | Grant | |
| 4,001,935 | A | 1/1977 | Krohn et al. | |
| 4,002,777 | A | 1/1977 | Juvinall et al. | |
| 4,030,857 | A | 6/1977 | Smith, Jr. | |
| 4,037,561 | A | 7/1977 | LaFave et al. | |
| 4,075,677 | A | 2/1978 | Bentley | |
| 4,081,904 | A | 4/1978 | Krohn et al. | |
| 4,105,164 | A | 8/1978 | Lau et al. | |
| 4,114,564 | A | 9/1978 | Probst | |
| 4,116,364 | A | 9/1978 | Culbertson et al. | |
| 4,133,483 | A | 1/1979 | Henderson | |
| D252,097 | S | 6/1979 | Probst et al. | |
| 4,165,022 | A | 8/1979 | Bentley et al. | |
| 4,169,545 | A | 10/1979 | Decker | |
| 4,174,070 | A | 11/1979 | Lau et al. | |
| 4,174,071 | A | 11/1979 | Lau et al. | |
| 4,187,527 | A | 2/1980 | Bentley | |
| 4,214,709 | A | 7/1980 | Scull et al. | |
| 4,216,915 | A * | 8/1980 | Hengartner et al. | 239/698 |
| 4,219,865 | A | 8/1980 | Malcolm | |
| 4,248,386 | A | 2/1981 | Morle | |
| 4,290,091 | A | 9/1981 | Malcolm | |
| 4,324,812 | A | 4/1982 | Bentley | |
| 4,331,298 | A | 5/1982 | Bentley et al. | |
| RE30,968 | E | 6/1982 | Grant | |

(Continued)

*Primary Examiner*—Alexander J Kosowski
(74) *Attorney, Agent, or Firm*—Barnes & Thornburg LLP

(57) ABSTRACT

Methods and apparatus for electrostatically aided atomization and dispensing of coating material. The apparatus includes a power supply for supplying operating potential and a coating dispensing device remote from the power supply. The coating dispensing device includes an input/output (I/O) device. The I/O device includes at least one indicator for selectively indicating a commanded state of the power supply and a fault state of at least one of the power supply and the coating dispensing device. A pair of conductors couple the I/O device to the power supply. Commands are coupled from the I/O device to the power supply. Commanded state information and fault state information are coupled from the power supply to the I/O device.

23 Claims, 8 Drawing Sheets

U.S. PATENT DOCUMENTS 4,361,283 A 11/1982 Hetherington et al.
D270,179 S 8/1983 Grime
D270,180 S 8/1983 Grime
D270,367 S 8/1983 Grime
D270,368 S 8/1983 Grime
4,401,268 A 8/1983 Pomponi, Jr.
4,433,812 A 2/1984 Grime
4,437,614 A 3/1984 Garcowski
4,453,670 A 6/1984 Sirovy
4,481,557 A 11/1984 Woodruff
4,483,483 A 11/1984 Grime
4,485,427 A 11/1984 Woodruff et al.
4,513,913 A 4/1985 Smith
4,529,131 A 7/1985 Rutz
4,537,357 A 8/1985 Culbertson et al.
4,606,501 A 8/1986 Bate et al.
4,613,082 A 9/1986 Gimple et al.
D287,266 S 12/1986 Knetl et al.
4,702,420 A 10/1987 Rath
4,745,520 A 5/1988 Hughey
4,747,546 A 5/1988 Talacko
4,759,502 A 7/1988 Pomponi, Jr. et al.
4,760,962 A 8/1988 Wheeler
4,770,117 A 9/1988 Hetherington et al.
4,844,342 A 7/1989 Foley
D303,139 S 8/1989 Morgan
D305,057 S 12/1989 Morgan
D305,452 S 1/1990 Morgan
D305,453 S 1/1990 Morgan
4,911,367 A 3/1990 Lasley
4,927,079 A 5/1990 Smith
4,934,603 A 6/1990 Lasley
4,934,607 A 6/1990 Lasley
4,993,645 A 2/1991 Buschor
5,022,590 A 6/1991 Buschor
D318,712 S 7/1991 Buschor
5,054,687 A 10/1991 Burns et al.
5,064,119 A 11/1991 Mellette
5,074,466 A 12/1991 Santiago
5,090,623 A 2/1992 Burns et al.
D325,241 S 4/1992 Buschor
5,118,080 A 6/1992 Hartmann
5,119,992 A 6/1992 Grime
5,159,544 A 10/1992 Hughey et al.
5,178,330 A 1/1993 Rodgers
5,180,104 A 1/1993 Mellette
5,209,365 A 5/1993 Wood
5,209,405 A 5/1993 Robinson et al.
5,236,129 A 8/1993 Grime et al.
5,284,299 A 2/1994 Medlock
5,284,301 A 2/1994 Kieffer
5,289,974 A 3/1994 Grime et al.
5,299,740 A 4/1994 Bert
5,303,865 A 4/1994 Bert
5,330,108 A 7/1994 Grime et al.
5,332,156 A 7/1994 Wheeler
5,332,159 A 7/1994 Grime et al.
D349,559 S 8/1994 Vanderhoef et al.
5,351,887 A 10/1994 Heterington et al.
5,395,054 A 3/1995 Wheeler
5,400,971 A 3/1995 Maugans et al.
5,553,788 A 9/1996 Del Gaona et al.
5,582,350 A 12/1996 Kosmyna et al.
5,618,001 A 4/1997 Del Gaone et al.
5,639,027 A 6/1997 Fritz
5,718,767 A * 2/1998 Crum et al. ................. 118/669
RE35,769 E 4/1998 Grime et al.
5,803,313 A 9/1998 Flatt et al.
5,829,679 A 11/1998 Strong
5,836,517 A 11/1998 Burns et al.
5,972,417 A * 10/1999 Perkins et al. ................. 427/8
RE36,378 E 11/1999 Mellette
5,978,244 A 11/1999 Hughey
6,144,570 A 11/2000 Hughey
6,179,223 B1 1/2001 Sherman et al.
6,189,809 B1 2/2001 Schwebemeyer
6,276,616 B1 8/2001 Jenkins
6,402,058 B2 6/2002 Kaneko et al.
6,423,142 B1 7/2002 Hughey
6,460,787 B1 10/2002 Hartle et al.
6,557,789 B1 * 5/2003 Haas .......................... 239/707
6,562,137 B2 * 5/2003 Hughey ...................... 118/621
6,572,029 B1 6/2003 Holt
6,669,112 B2 12/2003 Reetz, III et al.
6,698,670 B1 3/2004 Gosis et al.
6,712,292 B1 3/2004 Gosis et al.
6,758,423 B1 * 7/2004 Perkins et al. .............. 239/690
2002/0063636 A1 * 5/2002 Whitmore et al. ...... 340/870.09
2003/0006322 A1 1/2003 Hartle et al.
2003/0116086 A1 6/2003 Schroeder et al.
2004/0195405 A1 * 10/2004 Healy ......................... 239/690

* cited by examiner

IN-GUN POWER SUPPLY CONTROL

FIELD OF THE INVENTION

This invention relates to hand-held, electrostatically-aided coating atomizing and dispensing equipment (hereinafter sometimes electrostatic spray guns, or simply guns). However, it is believed to be useful in other applications as well.

BACKGROUND OF THE INVENTION

A great number of spray guns are known. Among configurations of interest are the configurations illustrated and described in the following listed U.S. Patents and published applications: 2003/0006322; 6,712,292; 6,698,670; 6,669,112; 6,572,029; 6,460,787; 6,402,058; RE36,378; 6,276,616; 6,189,809; 6,179,223; 5,836,517; 5,829,679; 5,803,313; RE35,769; 5,639,027; 5,618,001; 5,582,350; 5,553,788; 5,400,971; 5,395,054; D349,5.59; 5,351,887; 5,332,159; 5,332,156; 5,330,108; 5,303,865; 5,299,740; 5,289,974; 5,284,301; 5,284,299; 5,236,129; 5,209,405; 5,209,365; 5,178,330; 5,119,992; 5,118,080; 5,180,1.04; D325,241; 5,090,623; 5,074,466; 5,064,119; 5,054,687; D318,712; 5,022,590; 4,993,645; 4,934,607; 4,934,603; 4,927,079; 4,911,367; D305,453; D305,452; D305,057; D303,139; 4,844,342; 4,770,117; 4,760,962; 4,759,502; 4,747,546; 4,702,420; 4,613,082; 4,606,501; D287,266; 4,537,357; 4,529,131; 4,513,913; 4,483,483; 4,453,670; 4,437,614; 4,433,812; 4,401,268; 4,361,283; D270,368; D270,367; D270,180; D270,179; RE30,968; 4,331,298; 4,248,386; 4,214,709; 4,174,071; 4,174,070; 4,169,545; 4,165,022; D252,097; 4,133,483; 4,116,364; 4,114,564; 4,105,164; 4,081,904; 4,037,561; 4,030,857; 4,002,777; 4,001,935; 3,990,609; 3,964,683; and, 3,940,061. Reference is here also made to U.S. Pat. Nos. 6,562,137; 6,423,142; 6,144,570; 5,978,244; 5,159,544; 4,745,520; 4,485,427; 4,481,557; 4,324,812; 4,187,527; 4,075,677; 3,894,272; 3,875,892; and, 3,851,618. The disclosures of these references are hereby incorporated herein by reference. This listing is not intended to be a representation that a complete search of all relevant art has been made, or that no more pertinent art than that listed exists, or that the listed art is material to patentability. Nor should any such representation be inferred.

DISCLOSURE OF THE INVENTION

According to one aspect of the invention, an apparatus for electrostatically aided atomization and dispensing of coating material includes a power supply for supplying operating potential and a coating dispensing device remote from the power supply. The coating dispensing device includes an input/output (I/O) device. The I/O device includes at least one indicator for selectively indicating a commanded state of the power supply and a fault state of at least one of the power supply and the coating dispensing device. A pair of conductors are provided for coupling commands from the I/O device to the power supply, for coupling commanded state information from the power supply to the I/O device, and for coupling fault state information from the power supply to the I/O device.

Illustratively according to this aspect of the invention, the power supply includes a controller. The pair of conductors couple the I/O device to the controller to couple commands from the I/O device to the controller and to receive from the controller commanded state information and fault state information.

Illustratively according to this aspect of the invention, the controller includes an input port for coupling to one of the pair of conductors for receiving commands from the I/O device and an output port for coupling to said one of the pair of conductors for coupling commanded state information from the power supply to the I/O device, and for coupling fault state information from the power supply to the I/O device.

Illustratively according to this aspect of the invention, the input port comprises an input port to an analog-to-digital (A/D) converter provided in the controller.

Further illustratively according to this aspect of the invention, the apparatus includes a digital-to-analog (D/A) converter. The output port is coupled to said one of the pair of conductors through the D/A converter.

Further illustratively according to this aspect of the invention, the apparatus includes a current source. The output port is coupled to said one of the pair of conductors through the current source.

Illustratively according to this aspect of the invention, the power supply includes a controller. The pair of conductors couple the I/O device to the controller to couple commands from the I/O device to the controller and to receive from the controller commanded state information and fault state information.

Illustratively according to this aspect of the invention, the power supply includes a first terminal at which the power supply provides a regulated output voltage and the coating dispensing device includes a second terminal coupled to the first terminal. The regulated output voltage varies in response to the commands from the I/O device.

Illustratively according to this aspect of the invention, the regulated output voltage comprises a selectively variable, relatively lower magnitude, direct current (DC) voltage. The coating dispensing device includes an inverter and a multiplier for multiplying the regulated output voltage to a relatively higher magnitude DC voltage at an output electrode of the coating dispensing device.

Illustratively according to this aspect of the invention, the I/O device includes at least one indicator for providing a visual indication of at least one of commands coupled from the I/O device to the power supply, commanded state information coupled from the power supply to the I/O device, and fault state information coupled from the power supply to the I/O device.

Illustratively according to this aspect of the invention, the I/O device further includes a first switch for commanding the power supply to occupy a state.

Illustratively according to this aspect of the invention, the at least one indicator comprises at least one indicator for each state the power supply can occupy and a second switch for each state the power supply can occupy.

Illustratively according to this aspect of the invention, the at least one indicator for each state the power supply can occupy comprises at least one light emitting diode (LED) for each state the power supply can occupy and the second switch for each state the power supply can occupy comprises a separate Zener diode having a Zener voltage corresponding to each separate state the power supply can occupy.

Illustratively according to this aspect of the invention, each indicator is coupled in series circuit with a respective second switch, forming an indicator/second switch series circuit. The indicator/second switch series circuits are in parallel with each other. The first switch is coupled in parallel with the parallel-coupled indicator/second switch series circuits.

According to another aspect of the invention, a method is provided for controlling an apparatus for electrostatically aided atomization and dispensing of coating material. The apparatus includes a power supply for supplying operating potential and a coating dispensing device remote from the power supply. The coating dispensing device includes an input/output (I/O) device. The I/O device includes at least one indicator for selectively indicating a commanded state of the power supply and a fault state of at least one of the power supply and the coating dispensing device. The method includes providing a pair of conductors coupling the I/O device to the power supply, coupling commands from the I/O device to the power supply, coupling commanded state information from the power supply to the I/O device, and coupling fault state information from the power supply to the I/O device.

Illustratively according to this aspect of the invention, coupling commands from the I/O device to the power supply through the pair of conductors includes coupling commands from the I/O device to a controller in the power supply through the pair of conductors. Coupling commanded state information from the power supply to the I/O device and coupling fault state information from the power supply to the I/O device comprise coupling the controller to the I/O device through the pair of conductors.

Further illustratively according to this aspect of the invention, the method includes providing on the controller an input port and an output port. Coupling commands from the I/O device to the controller includes coupling the input port to one of the pair of conductors. Coupling commanded state information from the power supply to the I/O device and coupling fault state information from the power supply to the I/O device comprise coupling the output port to said one of the pair of conductors.

Further illustratively according to this aspect of the invention, the method includes providing on the power supply a first terminal, providing at the first terminal a regulated output voltage, providing on the coating dispensing device a second terminal, coupling the second terminal to the first terminal, and varying the regulated output voltage in response to the commands from the I/O device.

Illustratively according to this aspect of the invention, providing a regulated output voltage comprises providing a selectively variable, relatively lower magnitude, direct current (DC) voltage, providing on the coating dispensing device an inverter and a multiplier, and multiplying the regulated output voltage to a relatively higher magnitude DC voltage at an output electrode of the coating dispensing device.

Further illustratively according to this aspect of the invention, the method includes providing on the I/O device at least one indicator for providing a visual indication of at least one of commands coupled from the I/O device to the power supply, commanded state information coupled from the power supply to the I/O device, and fault state information coupled from the power supply to the I/O device.

Further illustratively according to this aspect of the invention, the method includes providing on the I/O device a first switch for commanding the power supply to occupy a state.

Illustratively according to this aspect of the invention, providing on the I/O device at least one indicator comprises providing on the I/O device at least one indicator for each state the power supply can occupy and a second switch for each state the power supply can occupy.

Illustratively according to this aspect of the invention, providing on the I/O device at least one indicator for each state the power supply can occupy comprises providing on the I/O device at least one light emitting diode (LED) for each state the power supply can occupy. Providing on the I/O device the second switch for each state the power supply can occupy comprises providing on the I/O device a separate Zener diode having a Zener voltage corresponding to each separate state the power supply can occupy.

BRIEF DESCRIPTION OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

Figures 1, 2:
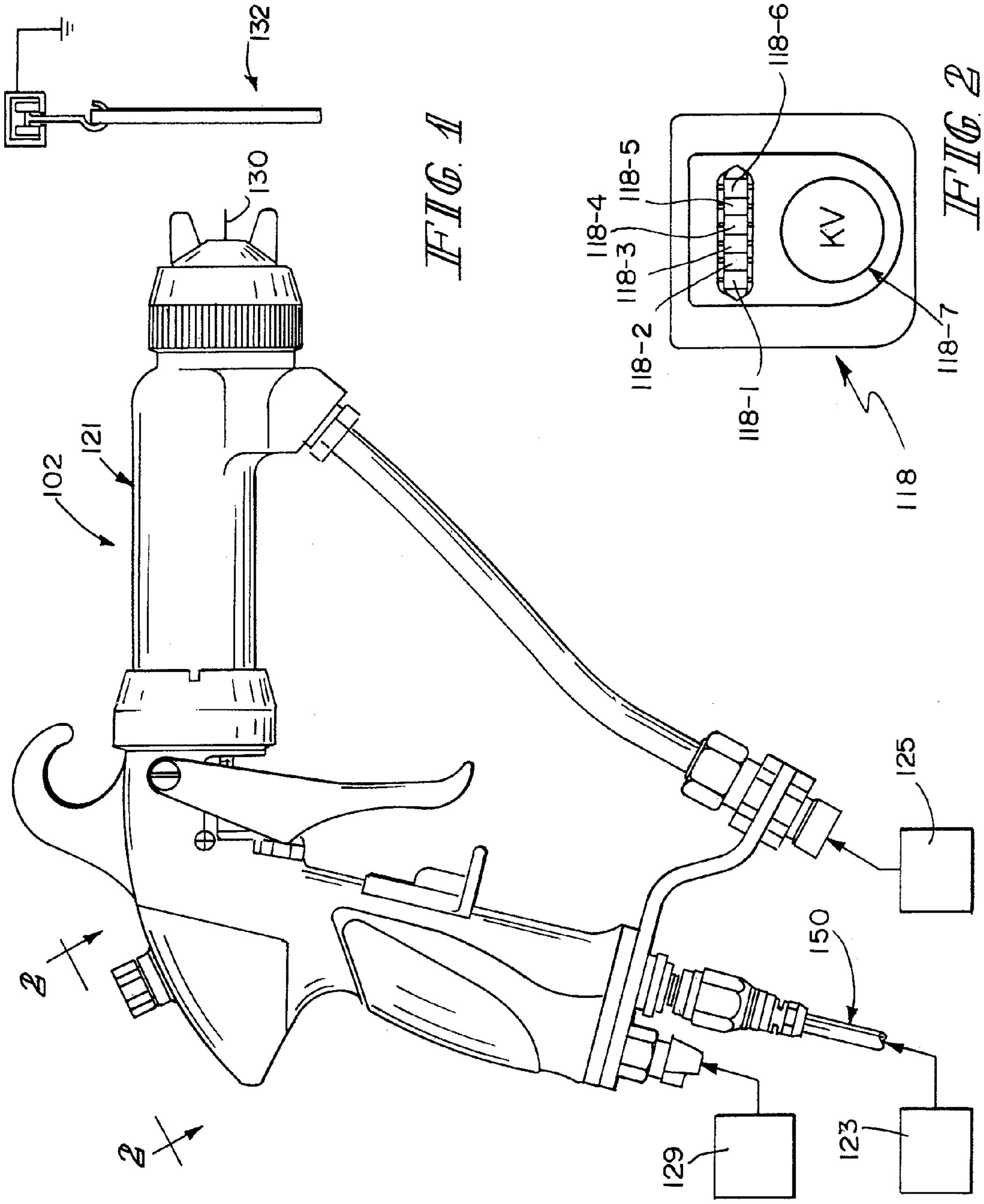
FIG. 1 illustrates a partly diagrammatic side elevational view of a system constructed according to the invention.
FIG. 2 illustrates a fragmentary sectional view taken generally along section lines 2-2 of FIG. 1.

In the detailed descriptions that follow, several integrated circuits (hereinafter sometimes ICs) and other components are identified, with particular component values, circuit types and sources. In many cases, terminal names and pin numbers for specifically identified circuit types and sources are noted. This should not be interpreted to mean that the identified component values and circuits are the only component values and circuits available from the same, or any, sources that will perform the described functions. Other components and circuits are typically available from the same, and other, sources which will perform the described functions. The terminal names and pin numbers of such other circuits may or may not be the same as those indicated for the specific circuits identified in this application.

Referring now particularly to FIGS. 1 and 3*a-c*, a power supply 100 for an electrostatic spray gun 102 includes an oscillator circuit 104, a driver circuit 106, a pair of switches 108-1, 108-2, a transformer 110 including a primary 110-1 and a secondary 110-2, a voltage multiplier 112. Supply 100 also includes a regulated voltage supply 114, a feedback circuit 116 and a power supply printed conductor (PC) control board 118. Components 104, 106, 108-1, 108-2, 114 and 116 are mounted on a PC board 119. Power supply control board 118 is mounted at the rear of the gun 102 for easy observation and input from the gun 102 operator. PC board 119 is mounted in the barrel 121 of gun 102. PC board 119 and components 110 and 112 are then potted in place in barrel 121 using high dielectric strength potting compound.

Oscillator circuit 104 illustratively includes a low power monostable/astable multivibrator IC, such as, for example, a Fairchild CD4047BCM IC having C, R, RCCommon, notASTable, ASTable, – (negative) TRiGger, VSS, + (positive) TRiGger, eXtemalREset, Q, notQ, ReTriGger, OSCillator output, and VDD terminals, pins 1-14, respectively. A 100 pF capacitor is coupled across the C and RCC terminals. A 13 KΩ resistor and 100 KΩ potentiometer in series are coupled across the R and RCC terminals. The notAST, AST and −TRIG terminals are coupled to 5 VDC supply. The VSS, +TRIG, XRE and RTG terminals are coupled to ground. The OSC terminal is coupled through a 100 KΩ resistor to 5 VDC. The VDD terminal is coupled to 5 VDC, and through a 100 nF capacitor to ground. The cathode of a 6.7 V Zener diode is coupled to the VDD terminal and its anode is coupled to ground.

Driver circuit 106 illustratively includes an FET driver IC, such as, for example, a Microchip Technology Inc., TC4426COA dual high-speed power MOSFET driver IC having INputA, GrouND, INputB, notOUTputB, VDD, and notOUTputA terminals, pins 2-7, respectively. The Q output terminal of oscillator circuit 104 is coupled to the INA terminal of driver circuit 106. The GND terminal of driver circuit 106 is coupled to ground. The notQ output terminal of oscillator circuit 104 is coupled to the INB terminal of driver circuit 106. The VDD terminal of driver circuit 106 is coupled to 5 VDC, and through a 100 nF capacitor to ground. The cathode of a 6.7 V Zener diode is coupled to the VDD terminal and its anode is coupled to ground.

The notOUTA and notOUTB terminals of driver circuit 106 are coupled to the gate electrodes of respective MOSFET switches 108-1 and 108-2. Switches 108-1 and 108-2 illustratively are International Rectifier IRLU3410 power MOSFETs. The gates of switches 108-1, 108-2 are coupled to the cathodes of respective 7.5 V Zener diodes, illustratively ON Semiconductor 1SMA5922BT3 Zener diodes, whose anodes are coupled to ground. The source terminals of both switches 108-1, 108-2 are coupled to ground, and their drain terminals are coupled to the opposite end terminals 110-1-1-1 and 110-1-1-2 of primary 110-1. The drains of switches 108-1, 108-2 are also coupled to the cathodes of respective 68 V Zener diodes, illustratively ON Semiconductor 1SMA5945 Zener diodes, whose anodes are coupled to ground. A series 33Ω, 0.5 W resistor and 4.7 nF capacitor are coupled across terminals 110-1-1-1 and 110-1-1-2 of primary 110-1. Voltage is supplied to a center tap 110-1-CT of primary 110-1.

Referring now particularly to FIGS. 3*c* and 4*a-c*, twenty diodes 122, each having a working reverse voltage of 20 KV and forward current of 5 mA, and twenty capacitors 124, each having a nominal capacitance of 120 pF, −10%, +30% and rated for 10 KV, are coupled in a conventional Cockcroft-Walton multiplier 126 configuration across the output terminals 110-2-1, 110-2-2 of secondary 110-2. Two 25 MΩ resistors 128 in series are coupled between the—output terminal 127 of multiplier 120 at the anode of diode 122-20 and the charging electrode 130 of electrostatic spray gun 102. One terminal of the first stage capacitor 124-1 is coupled to terminal 110-2-1. The cathode of the first stage diode 122-1 is coupled to terminal 110-2-2. Current returning to the multiplier 126 from the object 132 being coated by coating material dispensed from electrostatic spray gun 102 flows through a 50 KΩ current sensing resistor 134 coupled in parallel with a bidirectional 15 V Zener diode such as, for example, a Littelfuse SMBJ15CA, and a 0.47 μF capacitor, providing a power supply output current feedback signal at terminal IFB.

Regulated voltage supply 114 illustratively includes an ON Semiconductor LP2951ACDM low power, low dropout voltage regulator IC having OUTput, SeNSE, ShutDown, GrouND, notERRoroutput, Vo TAP, FeedBack and INput terminals, pins 1-8, respectively. The OUT and SNSE terminals are coupled together and form the 5 VDC supply. A 10 nF capacitor is coupled across the combined OUT and SNSE terminals, on the one hand, and the FB and TAP terminals, on the other. The parallel combination of a varistor such as, for example, an AVX VC120626D580DP, and a 1 μF, 25 V capacitor is coupled across the IN terminal and ground, and 5 Vin is coupled to the IN terminal.

A VCT voltage supply 123 with a maximum magnitude of, for example, 24 VDC, is coupled to the center tap 110-1-CT of primary 110-1. VCT power supply 123 may be, for example, a power supply of the type illustrated and described in one of the above-identified U.S. Pat. Nos. 5,978,244; 6,144,570; 6,423,142; or 6,562,137. Two parallel 22 μF, 35 V capacitors are coupled across the center tap 110-1-CT of primary 110-1 and ground. Gun 102 is also supplied with coating material from any suitable source 125, and additionally, may be supplied with compressed gas or mixture of gases (for example, compressed air) to aid in atomization from a suitable source 129.

Figure 3A:
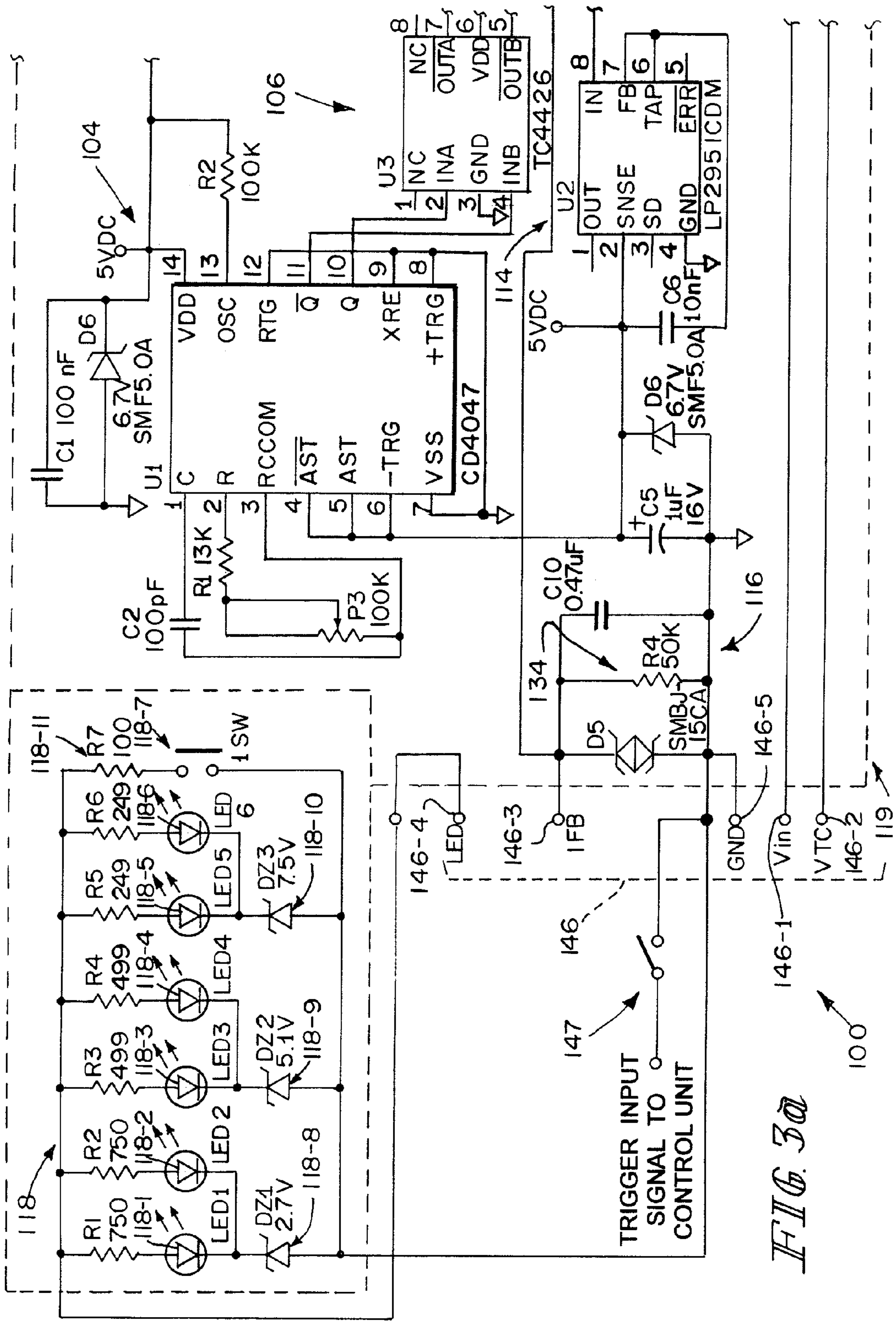
FIGS. 3*a-c* illustrate a partly block and partly schematic diagram of a power supply for an electrostatic spray gun constructed according to the invention.
Figure 3B:
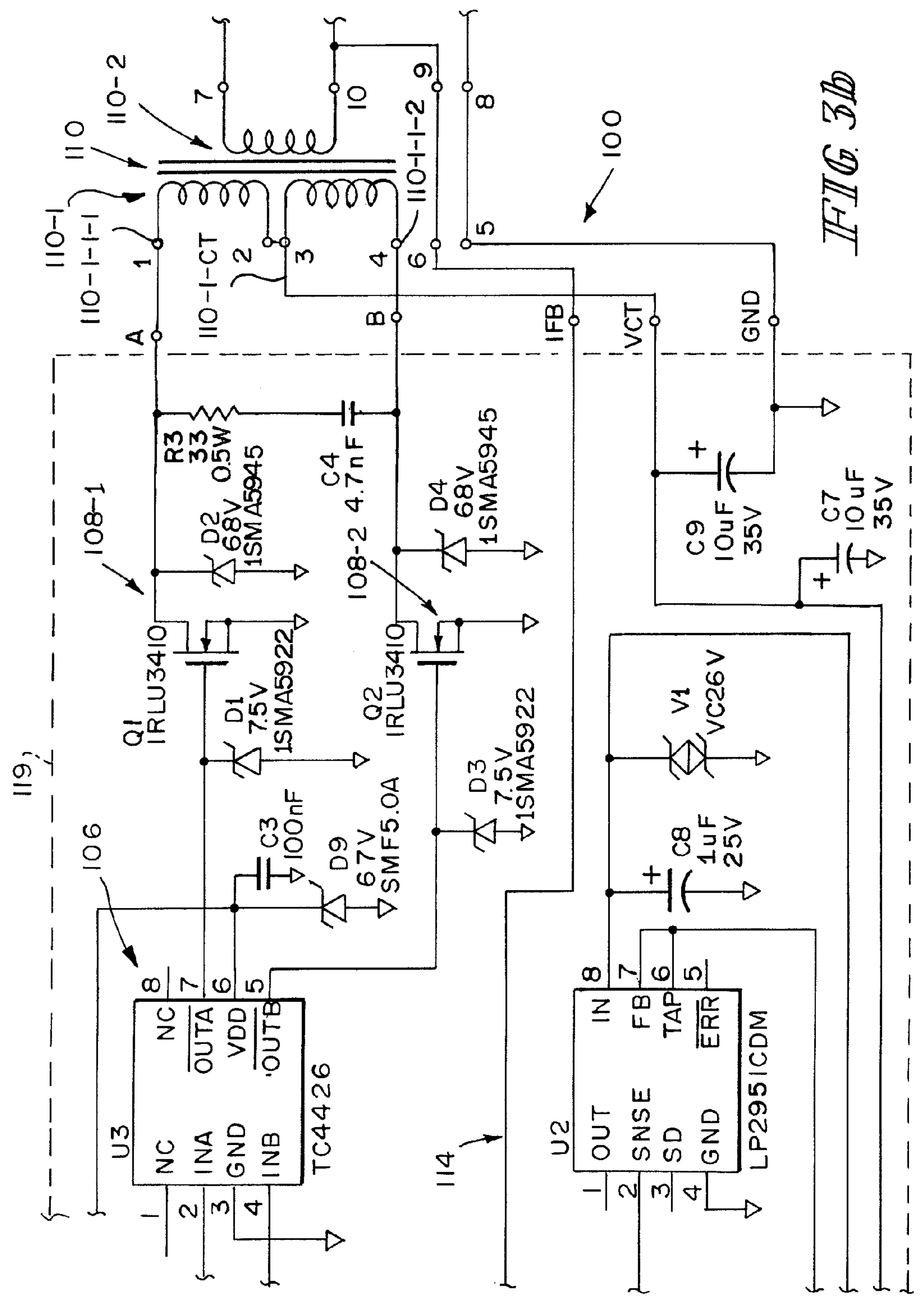
Figure 3C:
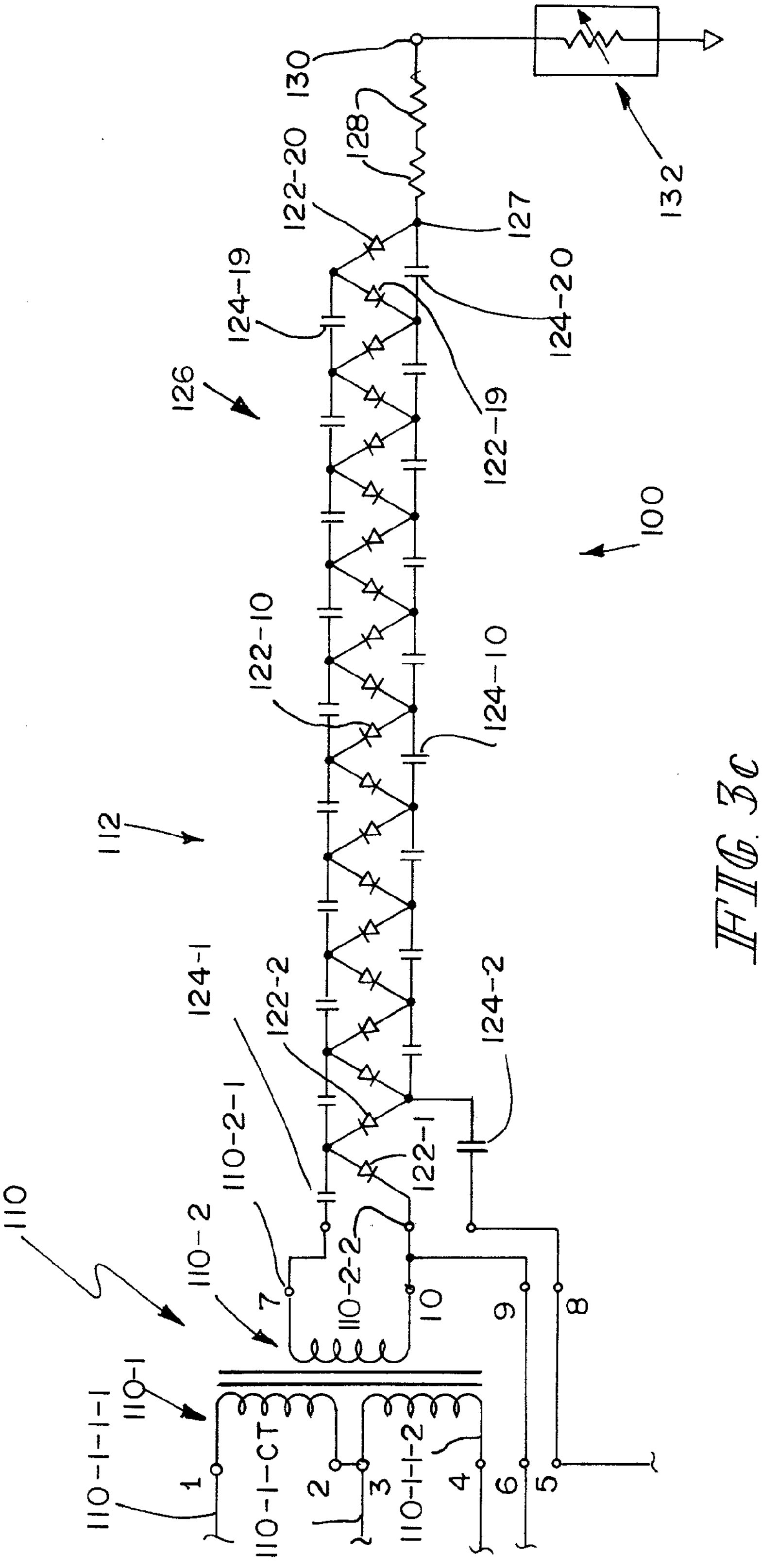
Figure 4C:
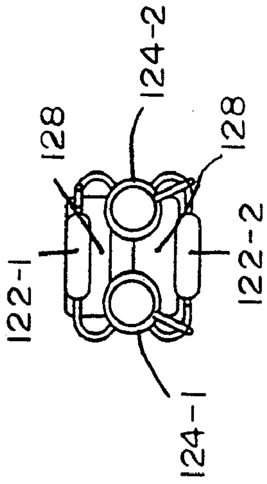
FIGS. 4*a-c* illustrate a side elevational view, a plan view and an end view, respectively, of certain components illustrated schematically in FIG. 3*c;*
Figure 4A:
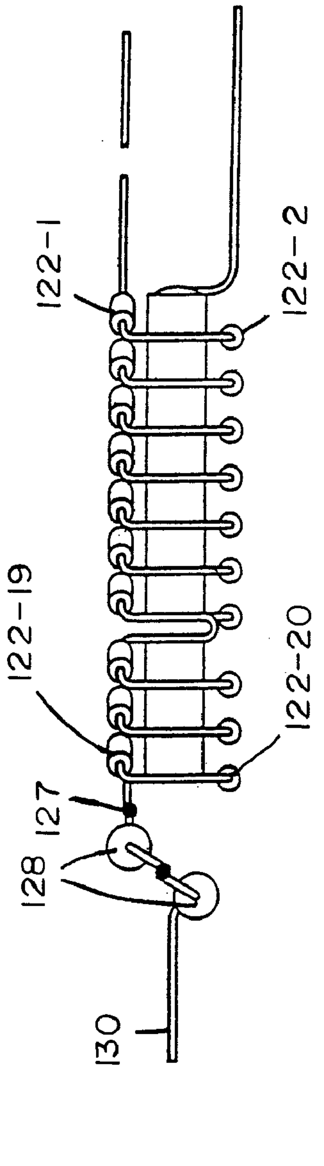
Figure 4B:
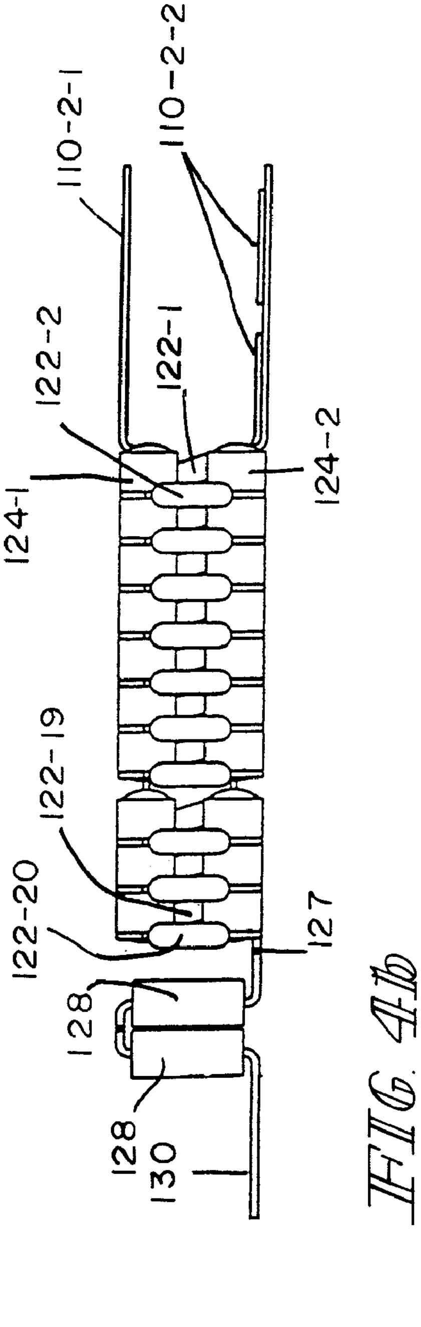
Figure 5:
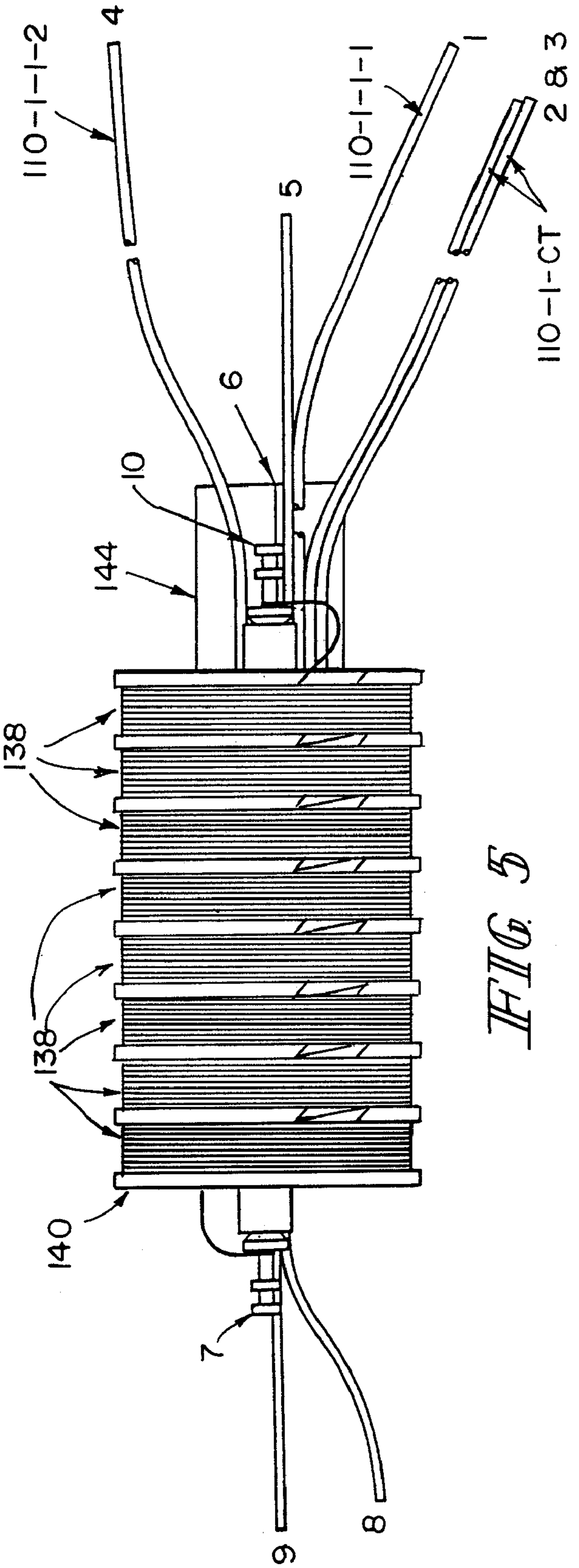
FIG. 5 illustrates an enlarged side elevational view of certain components illustrated schematically in FIGS. 3*b-c;*
Figure 6:
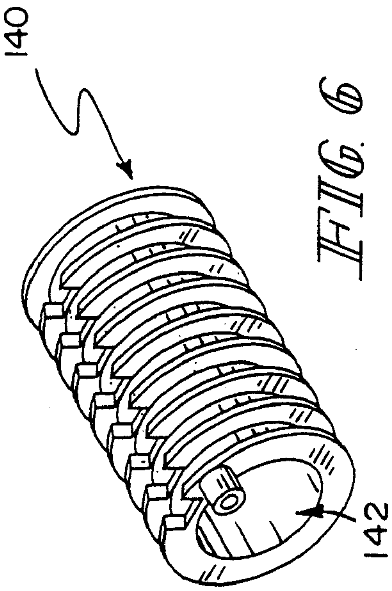
FIG. 6 illustrates a perspective view of a detail illustrated in FIG. 5.
Figure 7:
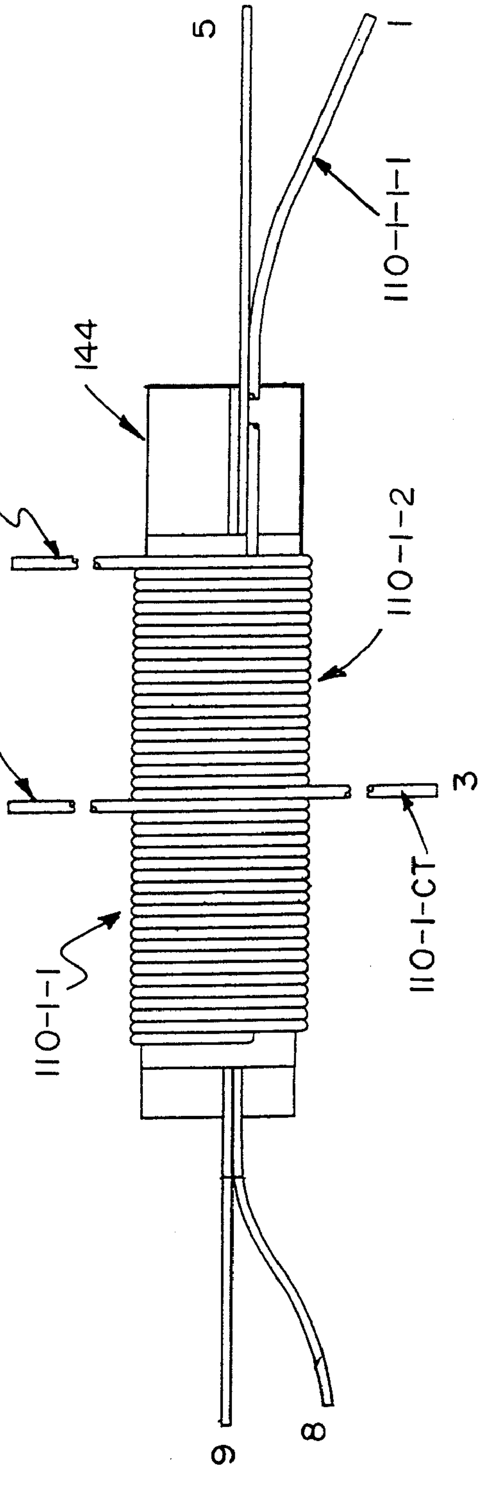
FIG. 7 illustrates a side elevational view of a detail illustrated in FIG. 5; and, FIG. 8 illustrates a partly block and partly schematic diagram of a circuit of the system illustrated in FIG. 1.

Referring now particularly to FIGS. 2 and 3*a*, power supply control board 118 includes an LED 118-1-6 display that provides an indication of actual gun 102 current (microamperes) when the gun 102 is triggered ON (switch 147 closed) and high-magnitude electrostatic potential is being generated. The LEDs 118-1-6 display the high-magnitude electrostatic potential setpoint (specifically, the voltage being supplied from VCT power supply 123 to the center tap 110-1-CT) when the gun 102 is triggered OFF (switch 147 open). The indication of the voltage being supplied to the center tap 110-1-CT is provided by a voltage at the LED terminal which is coupled through respective 750Ω resistors to the anodes of LEDs 118-1 and 118-2, through respective 499Ω resistors to the anodes of LEDs 118-3 and 118-4, and through respective 249Ω resistors to the anodes of LEDs 118-5 and 118-6. Illustratively, LEDs 118-1 and 118-2 are green, LEDs 118-3 and 118-4 are yellow, and LEDs 118-5 and 118-6 are red. The cathodes of LEDs 118-1 and 118-2 are coupled together and to the cathode of a 2.7 V Zener diode 118-8, the anode of which is coupled to ground. The cathodes of LEDs 118-3 and 118-4 are coupled together and to the cathode of a 5.1 V Zener diode 118-9, the anode of which is coupled to ground. The cathodes of LEDs 118-5 and 118-6 are coupled together and to the cathode of a 7.5 V Zener diode 118-10, the anode of which is coupled to ground. This circuit 118 provides a visual indication of the output status of multiplier 126 and permits the output voltage across electrode 130 and ground, as will be explained below.

Referring now particularly to FIGS. 3*b-c*, 5, 6 and 7, secondary 110-2 includes a number of turns 138 of, for example, 44 AWG heavy build insulated class F round magnet wire wound on a bobbin 140. Illustratively, 4800 turns are provided for a power supply with an output voltage of −35 KV, 7200 turns for a power supply with an output voltage of −65 KV, and 9600 turns for a power supply with an output voltage of −85 KV. Bobbin 140 illustratively is constructed from a resin such as, for example, polyphenylene sulfide (PPS). Bobbin 140 includes a central opening 142 for receiving primary 110-1 including a number of turns, illustratively, forty turns in two twenty turn halves 110-1-1 and 110-1-2, of 28 AWG class F heavy insulated round copper magnet wire wound on a core 144 illustratively constructed from ferrite such as, for example, Fair-Rite 77 material available from Fair-Rite Products Corporation.

The low voltage connection to the circuits mounted on PC board 119 is made through a low voltage contact plug 146 which is mounted on PC board 119. Plug 146 includes five terminals 146-1-146-5 providing the 5 Vin, VCT, IFB, LED and GND terminals.

A power supply fault condition indicates that high voltage cannot be delivered to electrode 130, for example, because the power supply 123 has detected a malfunction of its internal circuit, a malfunction of the conductor 150 coupling power supply 123 to VCT terminal 146-2, or a malfunction of gun 102 circuitry. The malfunction may be, for example, a temporary condition caused by the operator or the application. A power supply fault condition may also indicate that high voltage cannot be delivered to the electrode 130, for example, because the power supply 123 has determined that the maximum power capability of the gun 102 circuitry, FIGS. 3*a-c*, has been exceeded. This fault condition is generally referred to as an overload condition. Again, this may be a temporary condition caused by the operator or it may indicate a condition requiring maintenance to be performed. The system provides an indication to the operator that a condition requiring attention may have occurred. The system permits the operator to reset from the fault condition at the gun 102, that is, without having to put down the gun 102 and go reset the power supply 123.

The system makes use of integrated LED indicators 118-1-118-6 and membrane switch 118-7 to indicate to the gun 102 operator that a fault has occurred and that high voltage cannot be supplied. The system also provides the gun 102 operator with the capability to reset the power supply 123 from the gun 102 once such a fault has cleared.

A signal conductor coupled to LED terminal 146-4 and a return conductor coupled to GrouND terminal 146-5 are connected to power supply control board 118. Zener diodes 118-8, 118-9 and 118-10 of increasing voltage ratings 2.7V, 5.1V and 7.5 V, respectively, and current limiting resistors of 750Ω resistance, 499Ω resistance and 249Ω resistance, respectively, are connected in series with the LEDs 118-1-2, 118-3-4, and 118-5-6, respectively. Each LED 118-1-6 is illuminated when the input signal voltage exceeds the corresponding Zener diode rating of 2.7V, 5.1V or 7.5 V, respectively. The total current consumed by the power supply control board 118 is proportional to the number of LEDs 118-1-6 that are illuminated. A resistor 118-11 is supplied in series from the input signal at LED terminal 146-4 through the switch 118-7 to circuit GrouND. Switch 118-7 activation causes an increase in total circuit current detected by the power supply 123. The illustrated power supply control board 118 accommodates three preset voltage levels at VCT terminal 146-2, which correspond to three preset output voltage levels at electrode 130. The desired level is selected by the operator by depressing membrane switch 118-7 once for each increase in the desired output voltage. If switch 118-7 is depressed after LEDs 118-5-6 are energized, the power supply 123 cycles back to the lowest preset voltage level, illuminating only LEDs 118-1 and 118-2. The current to power supply control board 118 is monitored by the power supply 123 as confirmation of the selected preset level.

Figure 8:
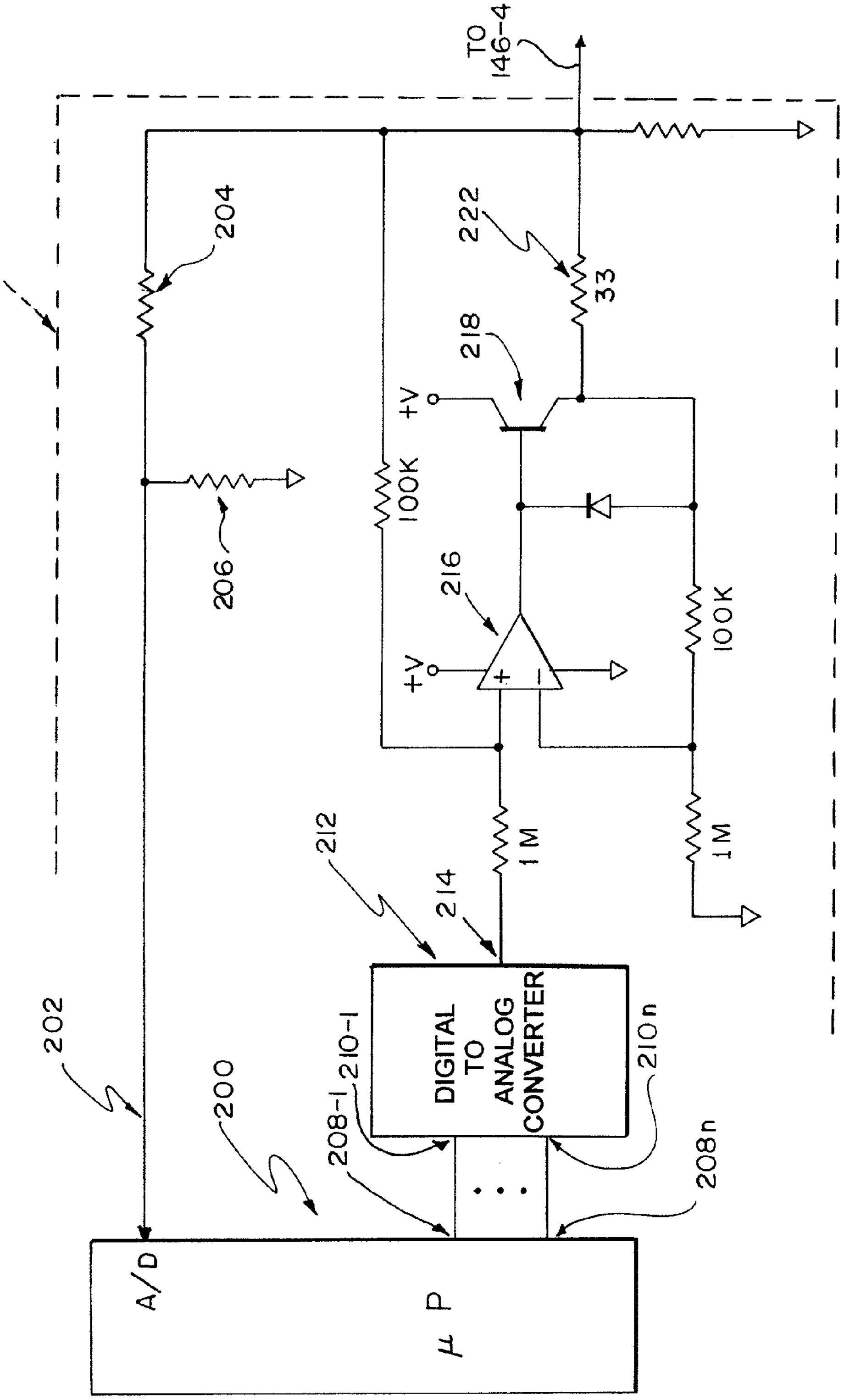

Power supply 123 includes a circuit for detecting the total current. With reference to FIG. 8, the microprocessor (μP) 200 of power supply 123, which may be, for example, the μP of the power supply described in any of the above-identified U.S. Pat. Nos. 5,978,244; 6,144,570; 6,423,142; or 6,562,137, includes an Analog-to-Digital (A/D) input port 202 which is coupled by a resistive voltage divider circuit including series 10 KΩ resistors 204 and 206 to LED terminal 146-4. The μP 200 determines if the correct voltage is present for the current preset level and if the switch 118-7 has been depressed. An output port 208-1-208-*n* of/μP 200 is coupled to an input port 210-1-210-*n* of a Digital-to-Analog (D/A) converter 212. An analog output port 214 of D/A converter 212 is coupled through a 1 MΩ resistor to a non-inverting (+) input terminal of a differential amplifier 216. The output terminal of amplifier 216 is coupled to the base electrode of a voltage-to-current converter bipolar transistor 218. The collector of transistor 218 is coupled to the +V DC supply. The emitter of transistor 218 is coupled through a 33 Ω resistor 222 to LED terminal 146-4. A 10 KΩ resistor may also be coupled from LED terminal 146-4 to ground. Feedback is provided from the LED terminal 146-4 to the + input terminal of amplifier 216 through a 100 KΩ resistor, and from the emitter of transistor 218 through a 100 KΩ resistor. A 1 MΩ resistor is coupled between the inverting (−) input terminal of amplifier 216 and ground. The anode of a diode is coupled to the emitter of transistor 218, and the cathode of the diode to the base of transistor 218.

A low value, for example, 100Ω, resistor 118-11 is in series with pushbutton switch 118-7. When switch 118-7 is momentarily closed, LED terminal 146-4 is coupled through resistor 118-11 to circuit GrouND terminal 146-5. The current source transistor 218 supplies constant output current commensurate with the commanded voltage level. Therefore, when current flows through switch 118-7 and resistor 118-11, the voltage at LED terminal 146-4 is reduced. The voltage reduction is interpreted by μP 200 as a pushbutton switch 118-7 depression.

The resistor values of 750Ω, 499Ω and 249Ω, respectively, associated with each LED color pair 118-1-2, 118-3-4, 118-5-6, respectively, decrease in value from green (118-1-2) through yellow (118-3-4) to red (118-5-6), respectively, and serve to limit current to below device maximum specifications. Each LED bank 118-1-2, 118-3-4, 118-5-6 is illuminated at the desired source transistor 218 output current and voltage at LED terminal 146-4. As the source signal at LED terminal 146-4 is commanded to increase by depression of switch 118-7, raising the voltage at LED terminal 146-4 until the next Zener diode 118-9 or 118-10 in sequence begins to conduct. This places another pair of LEDs 118-3-4 or 118-5-6 and their associated 499Ω or 249Ω resistors, respectively, in parallel with the LEDs 118-1-2 and their associated 750Ω resistors. The current increases through each pair of LEDs 118-1-2, 118-3-4, 118-5-6 given that the source signal is of sufficient magnitude to bias the 2.7 V Zener diode 118-8, the 5.1 V Zener diode 118-9 and the 7.5 V Zener diode 118-10 into conduction. Therefore, the developed output voltage at LED terminal 146-4 increases as the source signal current increases thereby illuminating each LED color bank 118-1-2, 118-3-4, 118-5-6 in succession.

In the event the μP 200 detects a fault condition, it removes the voltage at VCT terminal 146-2. It also pulses the base of transistor 218 with sufficient drive signal to illuminate all of LEDs 118-1-6, so that LEDs 118-1-6 flash, advising the operator of the fault condition. The operator depresses the membrane pushbutton switch 118-7 for at least two seconds to turn off the flashing LEDs 118-1-6. The operator may then depress switch 118-7 for two seconds to reinitialize the supply of voltage at the lowest preset level to VCT terminal 146-2, illuminating LEDs 118-1-2. If μP 200 does not detect a fault condition, operation of gun 102 proceeds. If μP 200 again detects a fault condition, it again removes the voltage at VCT terminal 146-2 and pulses the base of transistor 218 with sufficient drive signal to illuminate all of LEDs 118-1-6, so that LEDs 118-1-6 flash, advising the operator that the fault condition persists. The operator may then disable LEDs 118-1-6 and investigate the cause of the fault.

What is claimed is:

1. Apparatus for electrostatically aided atomization and dispensing of coating material, the apparatus including a power supply for supplying operating potential and a coating dispensing device remote from the power supply, the coating dispensing device including an input/output (I/O) device, the I/O device including at least one indicator for selectively indicating a commanded state of the power supply and a fault state of at least one of the power supply and the coating dispensing device, and a pair of conductors for coupling commands from the I/O device to the power supply, for coupling commanded state information from the power supply to the I/O device, and for coupling fault state information from the power supply to the I/O device.

2. The apparatus of claim 1 wherein the power supply includes a controller, the pair of conductors coupling the I/O device to the controller to couple commands from the I/O device to the controller and to receive from the controller commanded state information and fault state information.

3. The apparatus of claim 2 wherein the controller includes an input port for coupling to one of the pair of conductors for receiving commands from the I/O device and an output port for coupling to said one of the pair of conductors for coupling commanded state information from the power supply to the I/O device, and for coupling fault state information from the power supply to the I/O device.

4. The apparatus of claim 3 wherein the input port comprises an input port to an analog-to-digital (A/D) converter provided in the controller.

5. The apparatus of claim 3 further including a digital-to-analog (D/A) converter, the output port being coupled to said one of the pair of conductors through the D/A converter.

6. The apparatus of claim 3 further including a current source, the output port being coupled to said one of the pair of conductors through the current source.

7. The apparatus of claim 1 wherein the power supply includes a first terminal at which the power supply provides a regulated output voltage and the coating dispensing device includes a second terminal coupled to the first terminal, the regulated output voltage varying in response to the commands from the I/O device.

8. The apparatus of claim 7 wherein the power supply includes a controller, the pair of conductors coupling the I/O device to the controller to couple commands from the I/O device to the controller and to receive from the controller commanded state information and fault state information.

9. The apparatus of claim 8 wherein the regulated output voltage comprises a selectively variable, relatively lower magnitude, direct current (DC) voltage, the coating dispensing device including an inverter and a multiplier for multiplying the regulated output voltage to a relatively higher magnitude DC voltage at an output electrode of the coating dispensing device.

10. The apparatus of claim 1 wherein the I/O device includes at least one indicator for providing a visual indication of at least one of commands coupled from the I/O device to the power supply, commanded state information coupled from the power supply to the I/O device, and fault state information coupled from the power supply to the I/O device.

11. The apparatus of claim 10 wherein the I/O device further includes a first switch for commanding the power supply to occupy a state.

12. The apparatus of claim 11 wherein the at least one indicator comprises at least one indicator for each state the power supply can occupy and a second switch for each state the power supply can occupy.

13. The apparatus of claim 12 wherein the at least one indicator for each state the power supply can occupy comprises at least one light emitting diode (LED) for each state the power supply can occupy and the second switch for each state the power supply can occupy comprises a separate Zener diode having a Zener voltage corresponding to each separate state the power supply can occupy.

14. The apparatus of claim 12 wherein each indicator is coupled in series circuit with a respective second switch, forming an indicator/second switch series circuit, the indicator/second switch series circuits are in parallel with each other, and the first switch is coupled in parallel with the parallel-coupled indicator/second switch series circuits.

15. A method for controlling an apparatus for electrostatically aided atomization and dispensing of coating material, the apparatus including a power supply for supplying operating potential and a coating dispensing device remote from the power supply, the coating dispensing device including an input/output (I/O) device, the I/O device including at least one indicator for selectively indicating a commanded state of the power supply and a fault state of at least one of the power supply and the coating dispensing device, the method including providing a pair of conductors coupling the I/O device to the power supply, coupling commands from the I/O device to the power supply, coupling commanded state information from the power supply to the I/O device, and coupling fault state information from the power supply to the I/O device.

16. The method of claim 15 wherein coupling commands from the I/O device to the power supply through the pair of conductors includes coupling commands from the I/O device to a controller in the power supply through the pair of conductors, and coupling commanded state information from the power supply to the I/O device and coupling fault state information from the power supply to the I/O device comprise coupling the controller to the I/O device through the pair of conductors.

17. The method of claim 16 including providing on the controller an input port and an output port, coupling commands from the I/O device to the controller including coupling the input port to one of the pair of conductors, and coupling commanded state information from the power supply to the I/O device and coupling fault state information from the power supply to the I/O device comprise coupling the output port to said one of the pair of conductors.

18. The method of claim 15 including providing on the power supply a first terminal, providing at the first terminal a regulated output voltage, providing on the coating dispensing device a second terminal, coupling the second terminal to the first terminal, and varying the regulated output voltage in response to the commands from the I/O device.

19. The method of claim 18 wherein providing a regulated output voltage comprises providing a selectively variable, relatively lower magnitude, direct current (DC) voltage, providing on the coating dispensing device an inverter and a multiplier, and multiplying the regulated output voltage to a relatively higher magnitude DC voltage at an output electrode of the coating dispensing device.

20. The method of claim 15 including providing on the I/O device at least one indicator for providing a visual indication of at least one of commands coupled from the I/O device to the power supply, commanded state information coupled from the power supply to the I/O device, and fault state information coupled from the power supply to the I/O device.

21. The method of claim 20 including providing on the I/O device a first switch for commanding the power supply to occupy a state.

22. The method of claim 21 wherein providing on the I/O device at least one indicator comprises providing on the I/O device at least one indicator for each state the power supply can occupy and a second switch for each state the power supply can occupy.

23. The method of claim 22 wherein providing on the I/O device at least one indicator for each state the power supply can occupy comprises providing on the I/O device at least one light emitting diode (LED) for each state the power supply can occupy and providing on the I/O device the second switch for each state the power supply can occupy comprises providing on the I/O device a separate Zener diode having a Zener voltage corresponding to each separate state the power supply can occupy.

* * * * *